(12) United States Patent
DeBlock et al.

(10) Patent No.: US 6,546,682 B1
(45) Date of Patent: Apr. 15, 2003

(54) HURRICANE DOOR LIGHT

(75) Inventors: David A. DeBlock, Holland, MI (US); Michael S. Eveland, Fennville, MI (US)

(73) Assignee: ODL, Incorporated, Zeeland, MI (US)

( * ) Notice: Subject to any disclaimer, the term of this patent is extended or adjusted under 35 U.S.C. 154(b) by 0 days.

(21) Appl. No.: 09/974,264

(22) Filed: Oct. 10, 2001

(51) Int. Cl.$^7$ ................................ E04B 3/988
(52) U.S. Cl. ....................... 52/204.72; 52/204.68; 52/208; 52/455
(58) Field of Search ............................ 52/204.67, 208, 52/204.68, 455, 204.71, 204.72, 204.54, 204.53

(56) References Cited

U.S. PATENT DOCUMENTS

| | | |
|---|---|---|
| 3,630,814 A | 12/1971 | Arnold |
| 3,837,129 A | 9/1974 | Losell |
| 3,903,669 A | 9/1975 | Pease, Jr. et al. |
| 3,969,857 A | 7/1976 | Stark |
| 4,027,443 A | 6/1977 | Briggs |
| 4,030,258 A | 6/1977 | Anders |
| 4,081,581 A | 3/1978 | Littell, Jr. |
| 4,084,347 A | 4/1978 | Brown |
| 4,324,373 A | 4/1982 | Zibritosky |
| 4,368,226 A | 1/1983 | Mucaria |
| 4,525,961 A | 7/1985 | Hansen |
| 4,613,530 A * | 9/1986 | Hood et al. .................. 428/34 |
| 4,947,597 A | 8/1990 | Simpson |
| 4,947,606 A | 8/1990 | La See |
| 4,979,342 A | 12/1990 | Holdridge et al. |
| 4,989,381 A * | 2/1991 | DeBlock et al. ............... 52/204 |
| 5,128,181 A | 7/1992 | Kunert |
| 5,133,168 A * | 7/1992 | Neilly et al. .................. 52/585 |
| 5,139,850 A * | 8/1992 | Clarke et al. ................ 428/192 |
| 5,154,953 A | 10/1992 | de Moncuit et al. |
| 5,156,894 A * | 10/1992 | Hood et al. .................. 428/34 |
| 5,270,084 A * | 12/1993 | Parker .......................... 428/34 |
| 5,636,484 A | 6/1997 | DeBlock |
| 5,644,881 A * | 7/1997 | Neilly .......................... 42/455 |
| 5,765,325 A | 6/1998 | DeBlock |
| 5,778,629 A | 7/1998 | Howes |
| 5,983,593 A * | 11/1999 | Carbary et al. .......... 52/786.11 |
| 6,055,783 A * | 5/2000 | Guhl et al. ............... 52/204.62 |
| 6,318,037 B1 * | 11/2001 | Hansen ........................ 52/208 |

* cited by examiner

Primary Examiner—Carl D. Friedman
Assistant Examiner—Yvonne M. Horton
(74) Attorney, Agent, or Firm—Warner Norcross & Judd LLP (57) ABSTRACT

A penetration resistant doorlight including a frame and a laminated window assembly. The window assembly includes a glass panel laminated to a security film such as P.E.T. The security film extends beyond the perimeter edge of the window assembly to overlap the door. The film is secured both to the frame and to the door. In the preferred embodiment, a reinforcing insert is included in the frame and overlaps all of the window, the door, and the film.

13 Claims, 7 Drawing Sheets

HURRICANE DOOR LIGHT

BACKGROUND OF THE INVENTION

I. Field of the Invention

The present invention relates to windows and more particularly to impact-resistant and pressure-resistant windows.

II. Description of the Art

Exterior building windows are part of the "building envelope" comprising the exterior of the building. As part of the building envelope, exterior windows are subjected to a variety of weather extremes. An increasing number of building code standards and regulations have been, and continue to be, developed for such windows. In particular, many building codes include strenuous impact standards, which require a window to withstand impacts similar to those of a missile driven by high winds, as in a hurricane or a tornado. These building codes may also require the windows to withstand a variety of extreme cyclical pressure changes.

One such standard may be found in Chapters 16 and 24 of the Florida Building Code, Third Draft and in particular §1626, which requires a window to withstand (1) the impact of an object at high velocity and (2) subsequent cyclical pressure changes. Other building codes have strict requirements for skyscraper windows to reduce the likelihood of implosion or explosion in high winds.

Window manufacturers have developed, and continue to develop a variety of constructions in an effort to meet the evolving building code requirements. Examples of two such constructions are disclosed in U.S. Pat. No. 5,636,484 issued Jun. 10, 1997 to DeBlock and U.S. Pat. No. 5,765,325 issued Jun. 16, 1998 to DeBlock, which share a common disclosure of two embodiments. Both embodiments include a high-strength polycarbonate sheet (1) in the insulated glass assembly and (2) structurally and/or mechanically secured to the window frame. While a significant advance in the art, the development of even-stronger constructions has continued. For example, the most recent code requirements causes the polystyrene window frame to be the likely failure point in the prior construction.

SUMMARY OF THE INVENTION

The aforementioned problems are overcome by the present invention wherein an insulated glass (IG) assembly includes a flexible impact-resistant sheet incorporated into the laminated glass, extending beyond the laminated glass, and secured between the frame and the structure to which it is mounted (e.g. a door or a building).

In a preferred embodiment, the frame is injection molded of plastic and is reinforced with high-strength inserts extending between the frame and the glass.

The window unit is extremely strong and is believed to meet all current building code requirements. Further, the window unit is relatively simple and inexpensive.

These and other objects, advantages and features of the invention will be more fully understood and appreciated by reference to the detailed description of the preferred embodiments and the drawings.

DETAILED DESCRIPTION OF THE PREFERRED EMBODIMENT

I. First Embodiment

Figure 1:
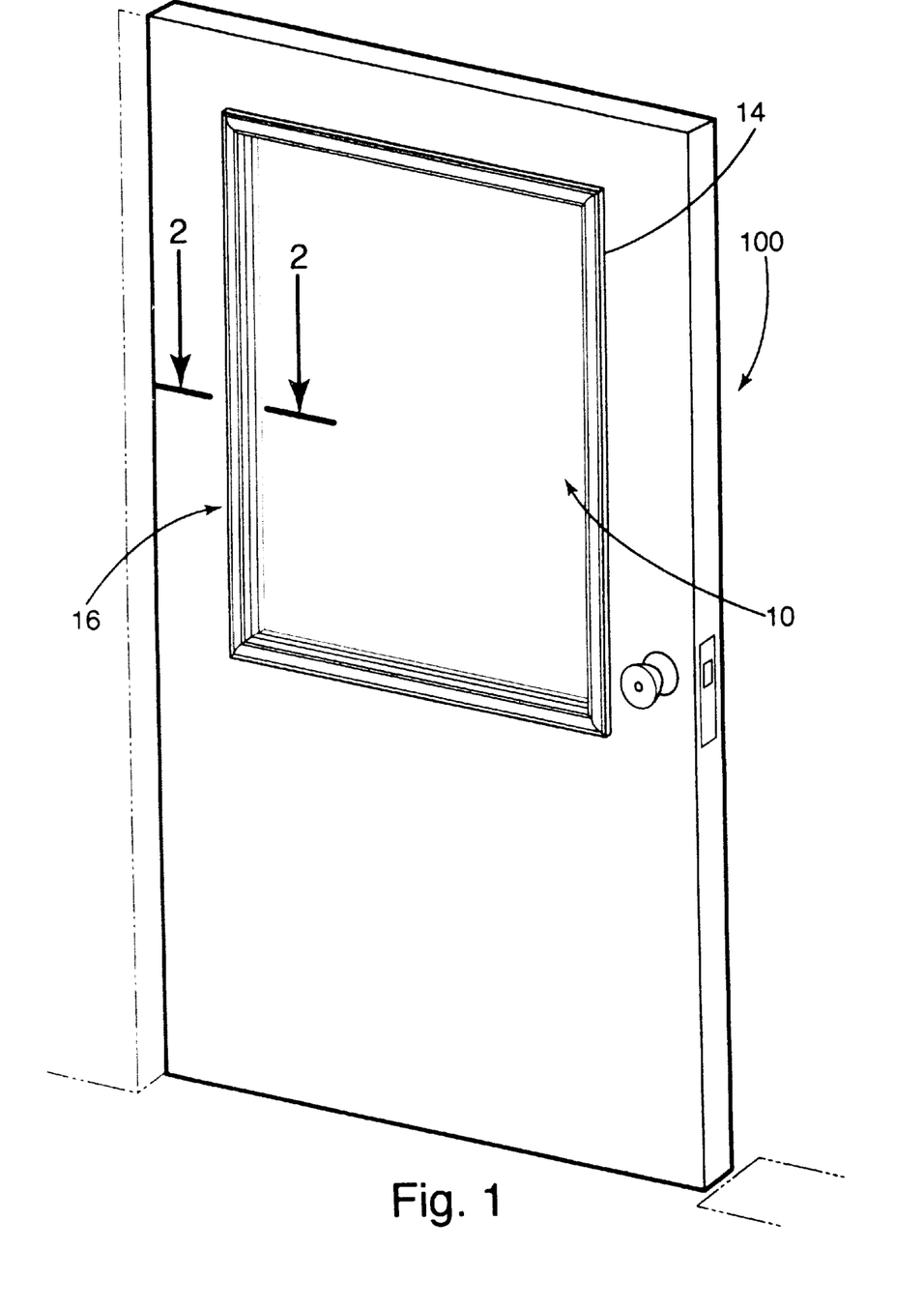
FIG. 1 is a perspective view of the doorlight of the present invention mounted within a door.
Figure 2:
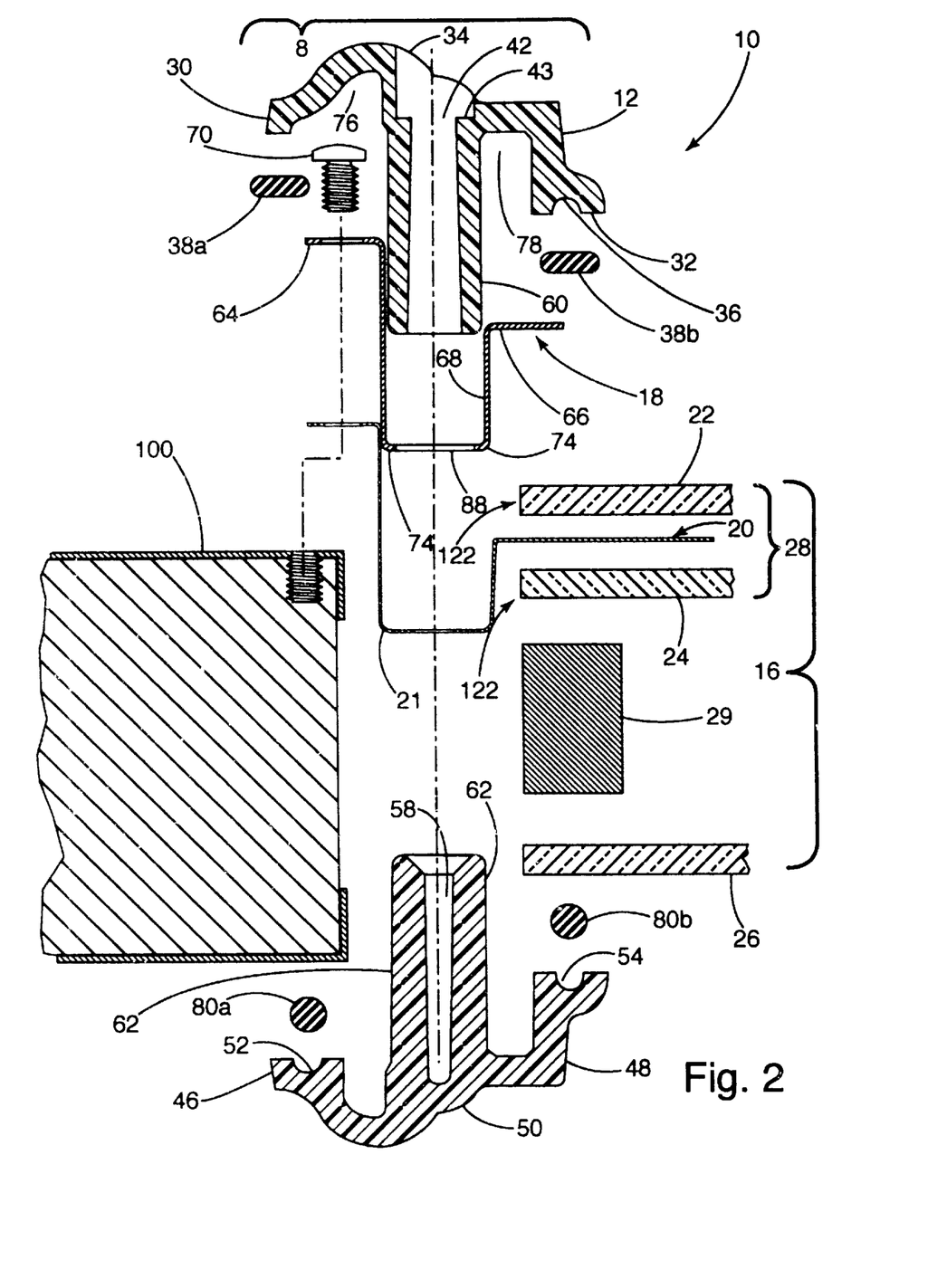
FIG. 2 is a fragmentary exploded sectional view taken along line 2—2 in FIG. 1.
Figure 3:
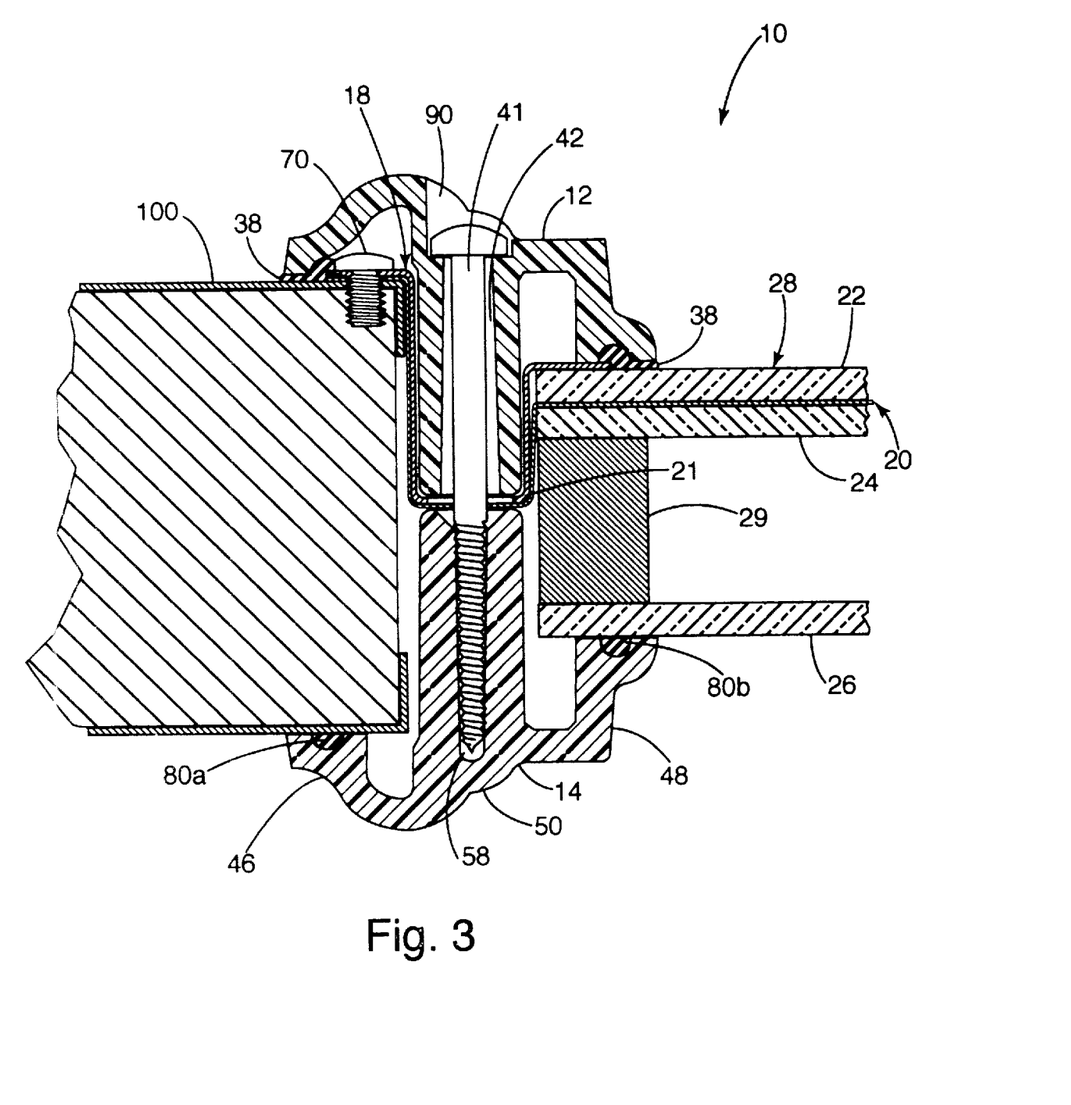
FIG. 3 is a fragmentary assembled sectional view taken along line 2—2 in FIG. 1.

By way of disclosure and not by way of limitation, a doorlight constructed in accordance with a preferred embodiment of the invention is illustrated in FIGS. 1–3 and generally designated 10. The doorlight 10 includes an IG assembly 16 and a frame assembly 8. The frame assembly 8 supports the IG assembly 16 within a door 100 or other supporting structure.

The IG assembly 16 in turn includes a laminated assembly 28, a first glass panel 26 and a spacer frame 29. If a non-insulated construction is desired, both the spacer frame 29 and the first glass panel 26 may be eliminated.

The laminated assembly 28 includes a second glass panel 24, a third glass panel 22 and a flexible impact resistant film 20. The glass panels 24 and 22 forming the laminated assembly 28 include a perimeter edge 122. The second glass panel 24 and the third glass panel 22 are laminated to the opposite sides of the film 20 using techniques well known to those skilled in the art. The film 20 includes a peripheral margin portion 21 that extends beyond the glass panels 22 and 24 in all directions. Alternatively, the film 20 could extend beyond the panels only in selected areas. In the preferred embodiment, the first, second and third glass panels 26, 24, and 22 are ⅛ inch tempered safety glass that meets ANSI Z97.1 and U.S. C.P.S.C. 16 CFR 1201 CI and CII. This glass is simply exemplary of the wide variety of glass, plastic, and other transparent or translucent materials that may be used. In the preferred embodiment, the film 20 is 7 mil thick polyethylene terephthalate (P.E.T.), although other thicknesses and/or materials may be readily used. The film 20 is flexible, although it may be semi-rigid depending on the thickness. The spacer frame 29 holds the laminated assembly 28 and the first glass panel 26 apart in an insulated construction. The fabrication of the spacer frame 29 and its attachment to the glass panels are well known to those skilled in the art.

The frame assembly 8 includes an inner frame half 12, an outer frame half 14, and a reinforcement frame insert 18. The frame halves are generally well known to those skilled in the art of doorlights and windows. The inner frame half 12 and the outer frame half 14 are fabricated of a high-performance UV-stable plastic or an injection-molded polystyrene. The inner frame half 12 and the outer frame half 14 are fastened together with a first fastening means for interconnecting the frame halves, such as screws 41 to secure the IG assembly 16 within the supporting structure 100.

The inner frame half 12 includes a door-engagement flange 30, an IG-assembly-engagement flange 32 and a main-body portion 34. The door-engagement flange 30 extends from the main-body portion 34 to the door 100 or support structure, and defines a first recess 76. The first recess 76 allows the second fastening means 70, discussed below, to be hidden from sight. The first recess 76 also receives a structural adhesive 38a to seal the door-engagement flange 30 to the door 100. The IG-engagement flange 32 extends from the main-body portion 34 to contact the IG assembly 16. The IG-engagement flange 32 defines a groove 40 extending along the length of the inner frame half 12 for receiving a structural adhesive 38b. The main-body portion 34 is located between the IG-engagement flange 32 and the door-engagement flange 30. The main-body portion 34 includes a plurality of screw bosses spaced about the inner frame half 12. Each screw boss 60 extends and defines a hole 42 through which a screw (not shown) passes.

The outer frame half 14 is somewhat of a mirror image of the inner frame half 12. The outer frame half 14 includes a door-engagement flange 46, a window-engagement flange 48 and a main-body portion 50. The door-engagement flange 46 defines a groove 52 in which a traditional gasket material 80a is placed. The window-engagement flange 48 defines a groove 54 in which a traditional gasket material 80b is placed. These grooves 52 and 54 extend around the perimeter of the entire outer frame 14. The main body portion 50 also includes a plurality of screw bosses 62 to receive the screws 41. One boss 62 is aligned with each boss 60 when the frame halves are aligned with one another.

The reinforcement frame 18 (FIGS. 2 and 3) is uniform in cross section throughout its length and includes a secured leg 64, a supporting leg 66 and a U-shaped channel 68. The channel 68 connects the supporting leg 66 and the secured leg 64. The secured leg 68 contacts the door or other supporting structure 100, and the supporting leg 66 contacts the IG assembly 16. The channel 68 includes a plurality of holes 88 to allow the screws (not shown) to pass through. The screws 70 secure the secured leg 68 to the door 100. In the preferred embodiment, the reinforcement frame 18 is 24 gauge steel, but may be any suitable thickness or material. To reduce materials, costs, and disposal issues, the reinforcement frame 18 can be made out of the skin of the door 100. In the preferred embodiment, the reinforcement frame 18 is located under the interior frame half 12 and on top of the supporting structure 100 and the IG assembly 16.

II. Manufacture and Installation of the First Embodiment

The present invention is adopted for installation within an opening of a supporting structure 100, such as a door. The IG assembly 10 may come in various sizes and shapes to fit within nearly any opening.

The glass panels 22, 24 and 26 are cut to the desired dimension and shape. The glass panels 22 and 24 are laminated to the film 20 forming the laminated assembly 28. The margin portion 21 of the film extends beyond the glass in all directions. The film 20 may be trimmed if necessary. The laminated assembly 28 and first glass panel 26 are sealed to opposite sides of the spacer frame 29 forming the IG assembly 16.

The reinforcement frame 18 is rollformed or stamped out of steel or aluminum. The frame halves 12 and 14 are injection molded out of polystyrene or another plastic. The frame halves 12 and 14 and the reinforcement frame 18 are assembled and packaged with the IG assembly 16 to create a product ready for shipping to the installer.

The installer cuts or otherwise forms an opening in the supporting structure or door 100. Conventional gaskets 80a–b are installed within the grooves 52 and 54 on the exterior frame half 14. The door 100 is oriented horizontally and the exterior frame half 14 is placed under the door aligned with the opening. The door-engagement flange 46 is sealed to the door 100 and the IG-engagement flange 48 is sealed to the IG assembly 16. The IG assembly 16 is placed within the formed opening and on top of the exterior frame half 14 with the film 20 overlapping the edges of the perimeter of the formed opening. The reinforcement frame 18 is then installed so that the secured leg 64 sandwiches the film 20 to the door 100 around the perimeter of the formed opening. The film 20 extends from the edges of the laminated glass panels 22 and 24 around the channel 68 and beyond the edges of the secured leg 64.

A structural adhesive 38a–b such as Dow #995 structural silicone is applied to the inner frame half 12 in the first recess 76 and the groove 36 (FIG. 2). Of course other adhesives and materials may be used to secure the inner frame half 12 to the door 100. The installer may be instructed to apply the adhesive 38 liberally to ensure a good seal. The inner frame half 12 is then inserted around the opening formed in the door 100. The door-engagement flange 30 is adhered to the door 100, and the secured leg 64 and the IG-engagement flange 32 are adhered to the IG assembly 16 and the supporting leg 66.

The screw bosses 60 on the inner frame half 12 fit within the channel 68 of the reinforcement frame 18. The holes 42 on the inner frame half 12 are aligned with the holes 88 on the reinforcement frame 20 and the holes 58 on the outer frame half 14 to allow the screws 41 to pass through and secure the frame halves 12 and 14 together. The head of the screw 41 rests on the shoulder 43 in the screw boss 60, and the screw is anchored in the boss 62.

The screws 41 draw the frame halves 12 and 14 together to sandwich (a) the door 100, secured leg 64 and security film 20 between the door engagement flanges 30 and 46, (b) the IG assembly 16 and the supporting leg 66 between the window engagement flanges 32 and 49 and (c) the reinforcement frame 18 and security film 20 between the bosses 60 and 62. This compresses the gaskets 80a–b and structural adhesive 38a–b to seal the outer and inner frame halves 14 and 12 against the IG assembly 16 and the door 100.

The film 20 is secured in two locations. First, the film is secured between the reinforcement frame 18 and the bosses 62, with the screws 41 passing through all three elements. Second, the film is secured between the reinforcement frame 18 and the door 100, with the screws 70 passing through all three elements. Consequently, the film 20 is securely retained in position so as to enable the window assembly to meet all current building code requirements. Any or all of the glass panels 22, 24, and 26 may break, but the film will remain intact and in position.

III. Alternative Embodiments

A. Second Embodiment

Figure 6:
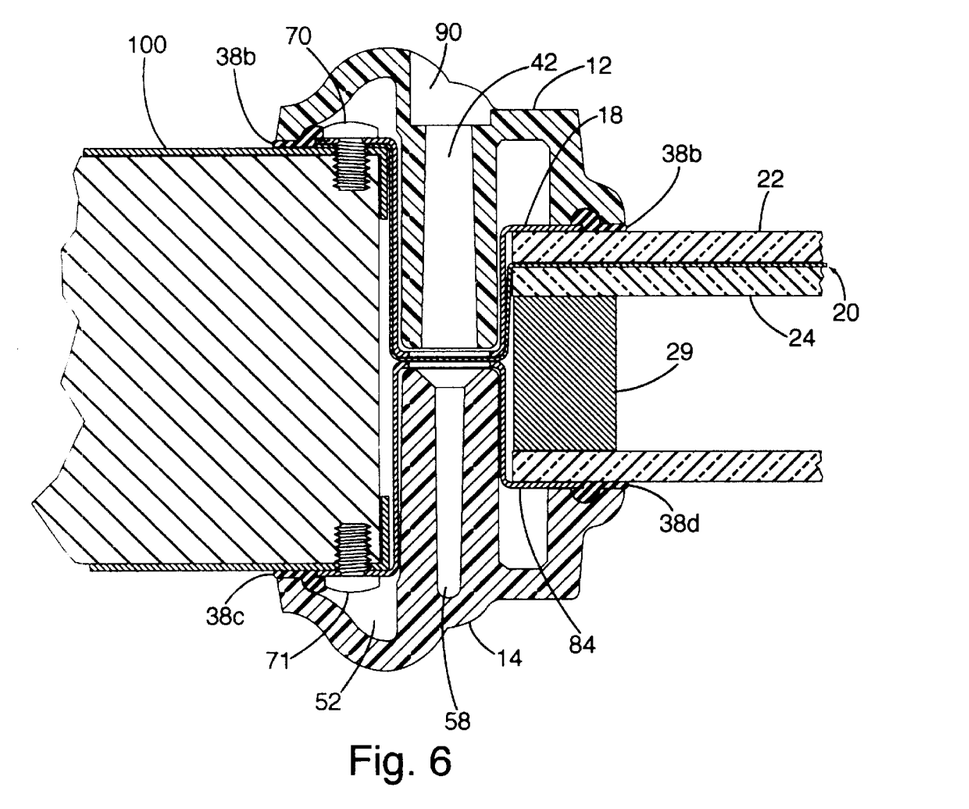
FIG. 6 is a fragmentary cross sectional view similar to FIG. 3 showing a first alternative embodiment of the invention.

In the second embodiment illustrated in FIG. 6, a second reinforcement frame 84 is added to the doorlight 10 to provide extra security, especially against sudden pressure changes. A fastening means 71 such as a screw secures the second reinforcement frame 84 to the door 100. The traditional gaskets 80a–b on the outer frame half 14 are replaced with a structural adhesive 38c–d. The outer frame half 14 also defines a recess 52 instead of the groove 52. The remaining construction and assembly of the doorlight 10 is generally identical to the corresponding elements described above in connection with the preferred embodiment.

B. Third Embodiment

Figure 7:
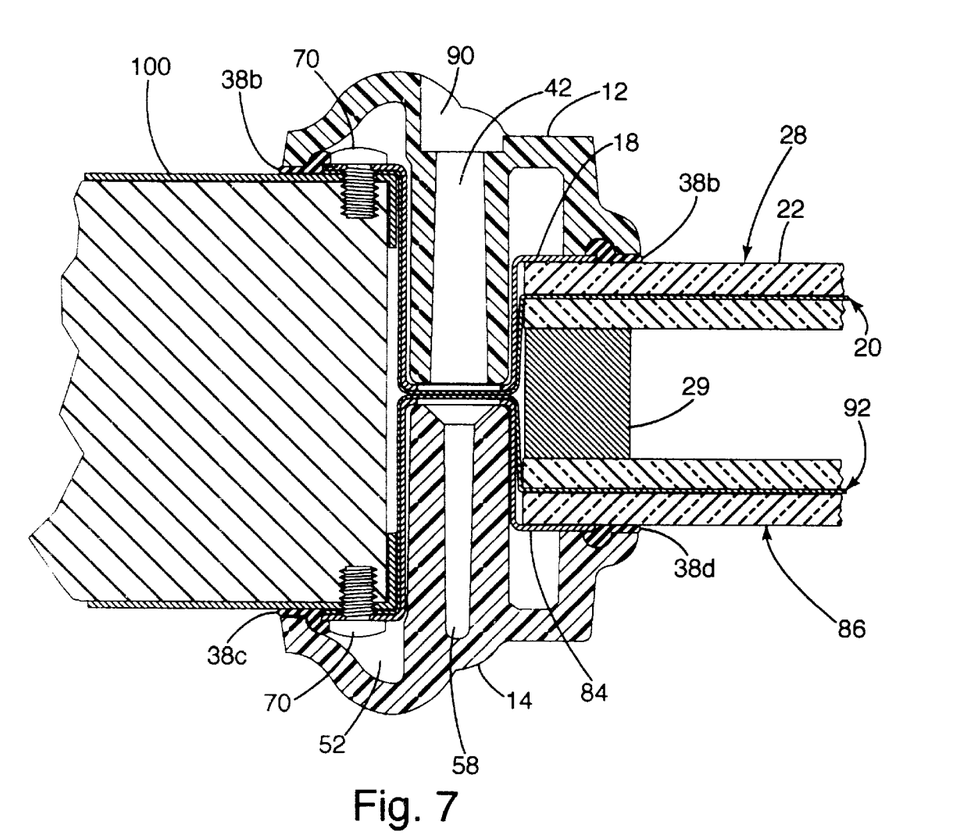
FIG. 7 is a fragmentary cross sectional view similar to FIG. 3 showing a second alternative embodiment of the invention.

In the third embodiment illustrated in FIG. 7, the first glass panel 26 is replaced with a second laminated assembly 86 identical to the first laminated assembly 28. The second film 92 also extends beyond the perimeter of the glass panels in the second laminated assembly 28. The second film 92 is stretched around the second reinforcement frame 84 to be secured to the door 100 just as the first film 20 was as described above in connection with the preferred embodiment. The remaining construction and assembly of this doorlight 10 is generally identical to the corresponding elements described above in connection with the preferred embodiment and the second embodiment.

C. Fourth Embodiment

Figure 4:
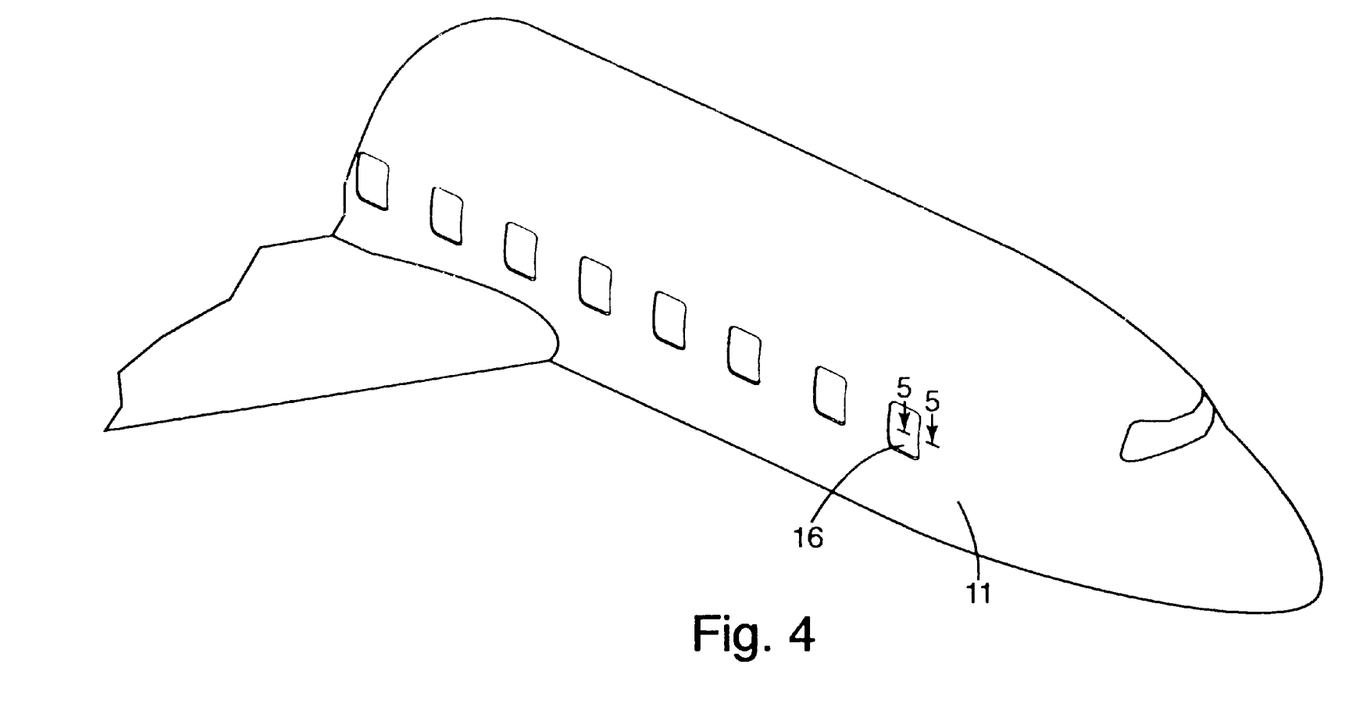
FIG. 4 is a perspective view of the window in an aircraft.
Figure 5:
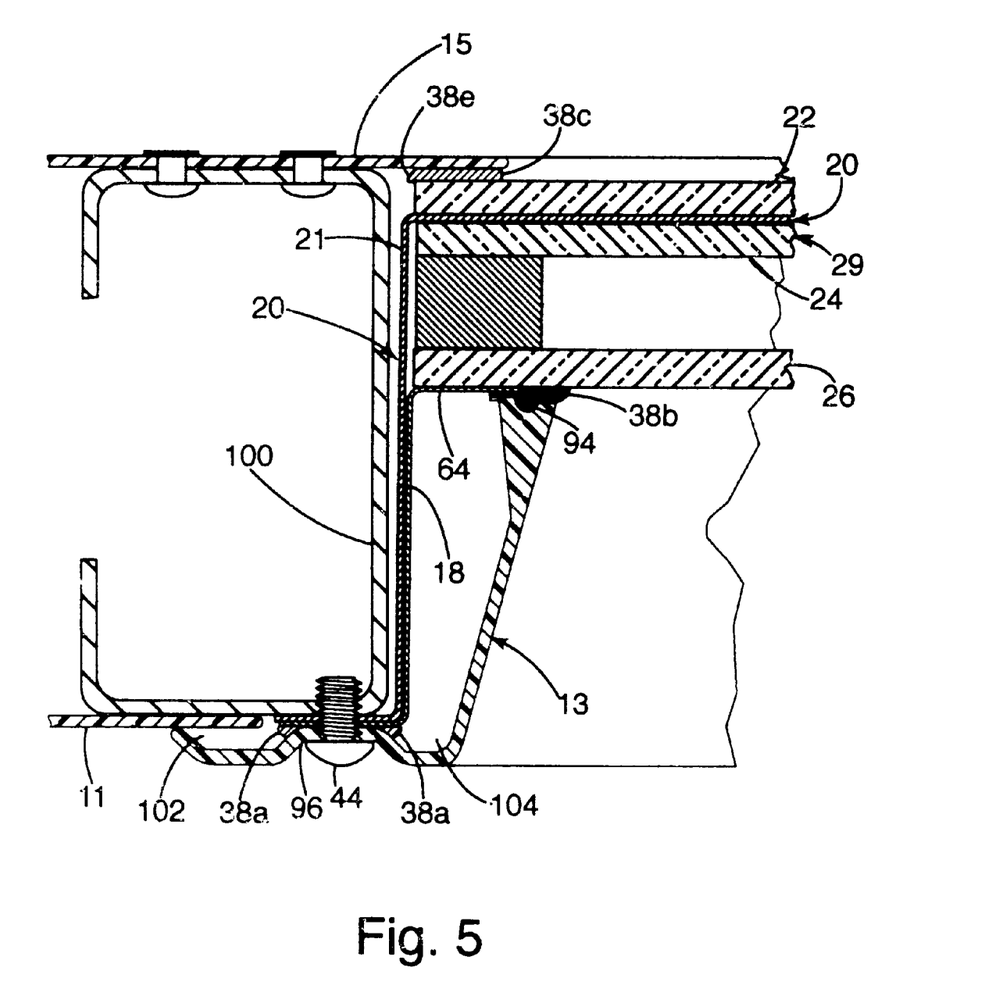
FIG. 5 is a sectional view taken along line 5—5 in FIG. 4.

In the fourth embodiment illustrated in FIGS. 4–5, the present invention is shown as a window 10 of an aircraft 100. The window 10 includes a window assembly 16 and a frame assembly 8 as described above with various modifications to fit within the opening on an aircraft. As shown in FIG. 5, the skin of the aircraft provides the outer frame half 15. Alternatively, an additional piece (not shown) may be secured around the perimeter edge of the opening to act as an outer frame half. The window assembly 16, constructed as disclosed above, is placed in the opening with the film 20 overlapping the inner edge of the formed opening. The window assembly 16 may be made in a variety of ways such as including a laminated assembly 29, two laminated assemblies (not shown), or using any of the alternative embodiments above. The reinforcement frame 18 is then placed around the perimeter of the opening sandwiching the film 20 to the supporting structure 100 with the secured leg 64 and the supporting leg 60 sandwiching the window assembly 16 against the outer skin 15. The inner frame half 13 has structural adhesive 38*b* applied to a groove 94. Structural adhesive 38*a* is applied around the indentation 96 so that it oozes into a first recess 102 and a second recess 104 defined by the inner frame half 13. Structural adhesive 38*e* is applied between the outer skin 15 of the aircraft 100 and the IG assembly 16. A fastening means 44 such as a screw then is tightened to draw the inner frame half 13 together with the outer skin 15. The outer skin 15 and the inner frame half 13 sandwich the supporting structure 100, reinforcement frame 18, film 20 and IG assembly 16. The structural adhesive 38*a, b,* and *e* may be a variety of materials used to fasten or secure parts together.

While this invention has been described in conjunction with doorlights and aircraft windows, it should be readily apparent that the present invention has a variety of uses in other applications such as building windows, skyscraper windows, mobile home windows, residential home windows and many more applications where glazing panels need to be impact resistant and resistant to pressure changes.

The above descriptions are those of preferred embodiments of the invention. Various alterations and changes can be made without departing from the spirit and broader aspects of the invention as set forth in the appended claims, which are to be interpreted in accordance with the principles of patent law including the doctrine of equivalents.

The embodiments of the invention in which an exclusive property or privilege is claimed are defined as follows:

1. A window assembly to be mounted in a supporting structure defining an opening having an edge, said assembly comprising:

a window positioned within said opening and including a transparent film and a panel laminated to said transparent film, said panel having a perimeter edge, said transparent film including a marginal portion extending beyond said perimeter edge of said panel and beyond said edge of said opening; and a frame adapted to support said window assembly within said opening, said frame including securing means for securing said margin portion between said frame and the supporting structure.

2. The window assembly of claim 1 wherein said transparent film is polyethylene terephthalate.

3. The window assembly of claim 1 comprising a structural adhesive on said frame for securing said frame to the supporting structure.

4. The window assembly of claim 1 wherein said frame comprises an inner frame, an outer frame, and a reinforcement frame, said reinforcement frame securing said transparent film to said supporting structure.

5. The window assembly of claim 4 wherein said reinforcement frame comprises:

a secured leg secured to said supporting structure;

a supporting leg supporting said window glass assembly; and a channel connecting said secured leg and said connecting leg.

6. The window assembly of claim 1 further comprising a panel intersecured in a spaced insulating construction to said panel laminated to said transparent film.

7. A window system comprising:

a structure defining an opening having a perimeter;

a window within said opening, said window including a panel having a perimeter edge, a transparent film laminated to said panel and extending beyond said perimeter edge to form a marginal portion, said marginal portion extending beyond said perimeter of said opening and overlapping said structure; and frame means for supporting said window within a structure, said frame means including securing means for securing said marginal portion to said structure.

8. The window assembly of claim 7 wherein said frame comprises an inner frame half, an outer frame half and a reinforcement frame between said inner frame half and said outer frame half, said marginal portion secured by said reinforcement frame and at least one of said inner frame half and said outer frame half.

9. The window assembly of claim 7 comprising a panel intersecured in an insulative construction to said panel bonded to said film.

10. The window assembly of claim 7 wherein said transparent film is polyethylene terephthalate.

11. A door/doorlight assembly comprising:

a door defining an opening having an edge;

a window assembly including a film and a pair of panels laminated to opposing sides of said film, said panels having generally aligned perimeter edges, said film including a marginal portion extending beyond said perimeter edges and beyond said edge of said opening;

a frame for supporting said window assembly within said opening, said frame including inner and outer frame halves and a reinforcement member, said reinforcement member including a first portion between said glass and said inner frame, a second portion between said door and said inner frame, and a third portion between said inner and outer frames, said film including a first portion secured between said third portion of said reinforcement member and said outer frame, said film further including a second portion secured between said second portion of said reinforcement member and said door.

12. The doorlight of claim 11 further comprising a third panel and a spacer frame intersecuring said third panel and said window assembly in an insulative construction.

13. The doorlight of claim 11 wherein said film is polyethylene terephthalate.

* * * * *

US006546682C1

(12) EX PARTE REEXAMINATION CERTIFICATE (6182nd)

United States Patent
DeBlock et al.

(10) Number: US 6,546,682 C1
(45) Certificate Issued: Apr. 8, 2008

(54) HURRICANE DOOR LIGHT (75) Inventors: David A. DeBlock, Holland, MI (US); Michael S. Eveland, Fennville, MI (US)

(73) Assignee: ODL, Incorporated, Zeeland, MI (US)

Reexamination Request:
No. 90/007,947, Feb. 22, 2006

Reexamination Certificate for:
Patent No.: 6,546,682
Issued: Apr. 15, 2003
Appl. No.: 09/974,264
Filed: Oct. 10, 2001

(51) Int. Cl.
*E06B 3/988* (2006.01)

(52) U.S. Cl. .............................. 52/240.72; 52/204.68; 52/208; 52/455

(58) Field of Classification Search ................ 52/204.5, 52/204.67, 204.68, 204.71, 204.72, 204.54, 52/204.53, 455
See application file for complete search history.

(56) References Cited

U.S. PATENT DOCUMENTS

| 2,300,506 A | 11/1942 | Kamerer ...................... 189/64 |
| 2,356,878 A | 8/1944 | Painter ........................ 189/64 |
| 2,374,057 A | 4/1945 | Watkins ..................... 154/2.71 |
| 2,398,886 A | 4/1946 | Drake et al. ................ 154/2.71 |
| 2,408,483 A | 10/1946 | Rodman ...................... 189/76 |
| 2,409,808 A | 10/1946 | Sowle ......................... 189/64 |
| 2,444,976 A | 7/1948 | Brown ........................ 20/56.5 |
| 2,567,353 A | 9/1951 | Ryan .......................... 154/2.77 |
| 2,659,686 A | 11/1953 | Watkins ..................... 154/2.71 |
| 2,679,467 A | 5/1954 | Sherts ........................ 154/2.73 |
| 3,343,317 A | 9/1967 | Cripe ............................ 52/208 |
| 4,952,258 A | 8/1990 | Grolig et al. ................. 156/99 |
| 5,636,484 A | 6/1997 | DeBlock ..................... 52/204.5 |
| 5,937,611 A | 8/1999 | Howes .................... 52/745.15 |

*Primary Examiner*—Matthew C. Graham (57) ABSTRACT

A penetration resistant doorlight including a frame and a laminated window assembly. The window assembly includes a glass panel laminated to a security film such as P.E.T. The security film extends beyond the perimeter edge of the window assembly to overlap the door. The film is secured both to the frame and to the door. In the preferred embodiment, a reinforcing insert is included in the frame and overlaps all of the window, the door, and the film.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 11 is confirmed.

Claims 1–10, 12 and 13 are determined to be patentable as amended.

New claims 14 and 15 are added and determined to be patentable.

1. A [window assembly] *doorlight* to be mounted in a [supporting structure] *building door* defining an opening having an edge, said [assembly] *doorlight* comprising:
   a window positioned within said opening and including a transparent film and a panel laminated to said transparent film, said panel having a perimeter edge, said transparent film including a marginal portion extending beyond said perimeter edge of said panel and beyond said edge of said opening *to overlap the door*; and
   a frame [adapted to support] *supporting* said window [assembly] within said opening, said frame including securing means for securing said [margin] *marginal* portion between said frame and the [supporting structure] *door*.

2. The [window assembly] *doorlight* of claim [1] *14* wherein said transparent film is polyethylene terephthalate.

3. The [window assembly] *doorlight* of claim [1] *14 further* comprising a structural adhesive on said frame for securing said frame to the [supporting structure] *door*.

4. [The window assembly of claim 1 wherein] *A window assembly to be mounted in a supporting structure defining an opening having an edge, said assembly comprising:*
   *a window positioned within said opening and including a transparent film and a panel laminated to said transparent film, said panel having a perimeter edge, said transparent film including a marginal portion extending beyond said perimeter edge of said panel and beyond said edge of said opening; and*
   *a frame supporting said window within said opening, said frame including securing means for securing said marginal portion between said frame and the supporting structure,* said frame [comprises] *comprising* an inner frame, an outer frame, and a reinforcement frame, said reinforcement frame securing said transparent film to said supporting structure.

5. The window assembly of claim 4 wherein said reinforcement frame comprises:
   a secured leg secured to said supporting structure;
   a supporting leg supporting said window [glass assembly]; and
   a channel connecting said secured leg and said connecting leg.

6. The [window assembly] *doorlight* of claim [1] *14* further comprising a panel intersecured in a spaced insulating construction to said panel laminated to said transparent film.

7. A [window system] *door/doorlight assembly* comprising:
   a [structure] *building door* defining an opening having a perimeter;
   a window within said opening, said window including a panel having a perimeter edge, a transparent film laminated to said panel and extending beyond said perimeter edge to form a marginal portion, said marginal portion extending beyond said perimeter of said opening and overlapping said [structure] *door*; and
   frame means for supporting said window within [a structure] *the door*, said frame means including securing means for securing said marginal portion to [said structure] *the door*.

8. [The window assembly of claim 7 wherein] *A window assembly comprising:*
   *a structure defining an opening having a perimeter;*
   *a window within said opening, said window including a panel having a perimeter edge, a transparent film laminated to said panel and extending beyond said perimeter edge to form a marginal portion, said marginal portion extending beyond said perimeter of said opening and overlapping said structure; and*
   *frame means for supporting said window within a structure, said frame means including securing means for securing said marginal portion to said structure,* said frame [comprises] *means comprising* an inner frame half, an outer frame half and a reinforcement frame between said inner frame half and said outer frame half, said marginal portion secured by said reinforcement frame and at least one of said inner frame half and said outer frame half.

9. The [window] *door/doorlight* assembly of claim [7] *15* comprising a panel intersecured in an insulative construction to said panel bonded to said film.

10. The [window] *door/doorlight* assembly of claim [7] *15* wherein said transparent film is polyethylene terephthalate.

12. The *door/*doorlight *assembly* of claim 11 further comprising a third panel and a spacer frame intersecuring said third panel and said window assembly in an insulative construction.

13. The *door/*doorlight *assembly* of claim 11 wherein said film is polyethylene terephthalate.

14. *The doorlight of claim 1 wherein:*
    *said window includes opposite sides;*
    *said frame includes first portions adapted to engage said opposite sides of said window; and*
    *said frame includes second portions adapted to engage opposite sides of the door.*

15. *The door/doorlight assembly of claim 7 wherein:*
    *said window includes opposite sides;*
    *said frame means includes first portions engaging said opposite sides of said window;*
    *said door includes opposite sides; and*
    *said frame includes second portions engaging said opposite sides of said door.*

* * * * *